March 22, 1938.  R. YOUNG  2,111,718
HYDROCARBON SEPARATING APPARATUS
Filed Sept. 9, 1937
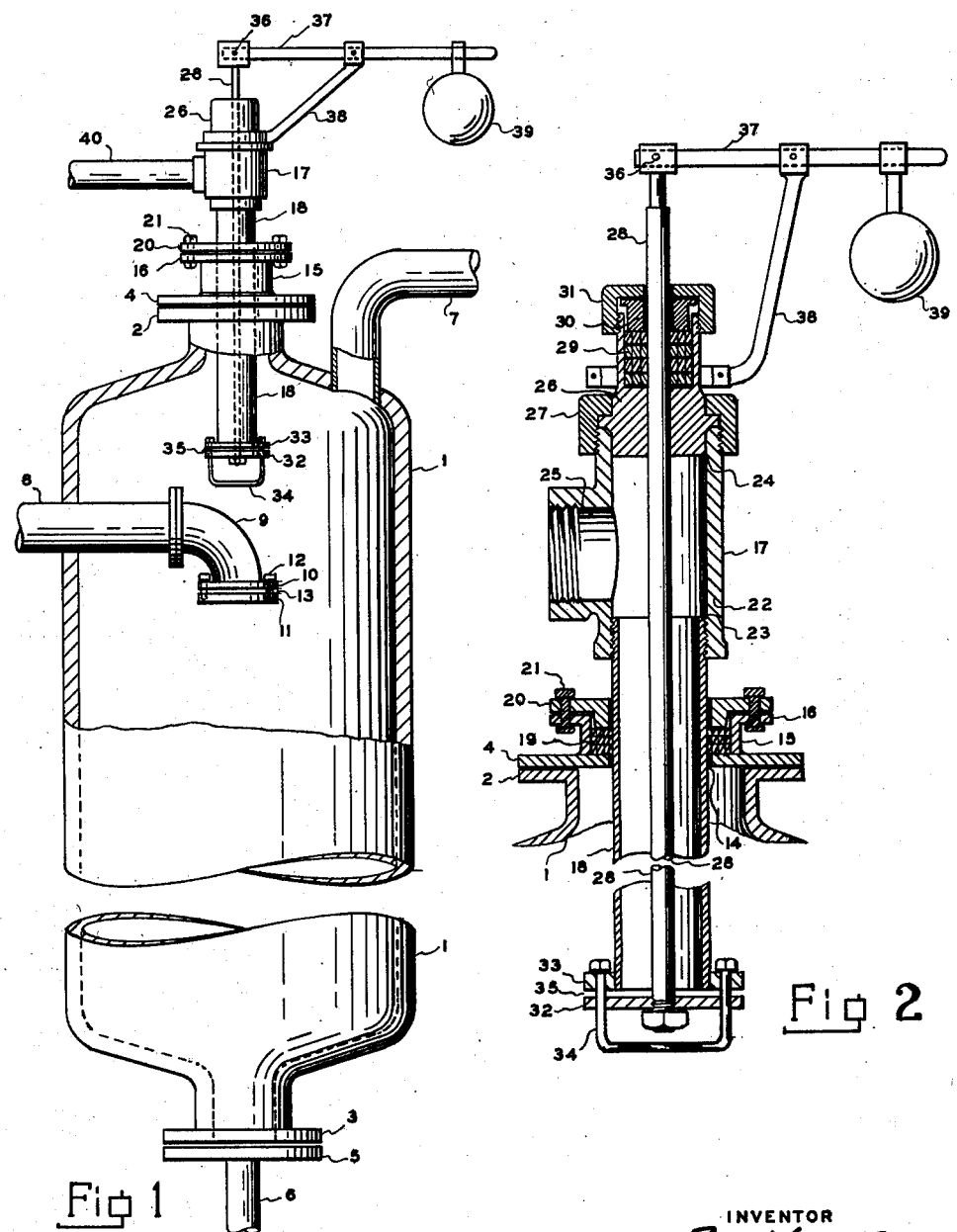
INVENTOR
REX YOUNG
BY
ATTORNEY Patented Mar. 22, 1938

2,111,718

UNITED STATES PATENT OFFICE 2,111,718

HYDROCARBON SEPARATING APPARATUS

Rex Young, Grandfield, Okla., assignor to Max G. Cohen, Tulsa, Okla.

Application September 9, 1937, Serial No. 163,075

5 Claims. (Cl. 196—127)

This invention relates to an improved apparatus for use in the thermal conversion of hydrocarbons.

In conventional thermal conversion processes, hydrocarbons are heated to elevated temperatures for a period of time sufficient to effect the desired degree of conversion thereof. Thereafter, the highly heated products are separated into desirable and undesirable constituents by vaporization of the former, the latter being retained in unvaporized state. In order to recover the maximum quantity of desirable constituents from the products, the temperature of vaporization of the products is such that the undesirable constituents, if subjected to such temperature for even a short period of time, will degrade to free carbon or other solid or semi-solid carbonaceous products, which tend to deposit in the apparatus and clog same and produce other undesirable results.

In a conventional liquid-phase or mixed-phase conversion process, hydrocarbons are heated to a temperature of 900° F. more or less and under pressures ranging up to 500 pounds per square inch or more, to effect their conversion to desired products. These products are then introduced into a separating chamber wherein lighter products are separated from heavier products by vaporization effected by means of the contained heat of the products and by reduction in pressure thereon. However, in order to effect the vaporization of as great a proportion as possible of the conversion products, the temperature of separation should be maintained, ordinarily, above 750° F. Since such a temperature is within the range in which higher boiling products will undergo decomposition and form solid or semi-solid carbon and carbonaceous matter, which tends to clog up the separating apparatus and contaminate the vaporized products, it is necessary to reduce the temperature and pressure conditions in the separating chamber to such that decomposition of heavy products is reduced to a minimum. Under these conditions, however, a relatively large proportion of desirable lighter products are condensed or remain unvaporized in the separating chamber from which they are removed in liquid mixture with the heavy undesirable products, and this mixture must then be re-processed to recover those products having desirable values. This and other disadvantages of conventional separating steps and apparatus are obviated by the apparatus of this invention.

A principal object of this invention is to provide improved apparatus for separating the highly heated products from thermal conversion processes.

Another object of this invention is to provide apparatus for the separation of conversion products at temperatures such that the maximum quantity of desirable products will be recovered in vapor form, while preventing the deposition of carbonaceous matter in the separating vessel.

Still another object is to provide a separating apparatus including a separating chamber having in conjunction therewith means for introducing highly heated conversion products into substantially uniformly distributed washing contact with the inner walls of the separating chamber, in combination with additional means for introducing a relatively cool hydrocarbon liquid into substantially uniformly distributed washing contact with the walls of said chamber.

A specific object is to provide a separating apparatus having a novel liquid distributing valve in conjunction therewith for flushing the walls of a separating chamber with a uniformly distributed wash liquid.

Another specific object is to provide a separating chamber, which is free of internal mechanical liquid-vapor contacting devices, but which instead utilizes a novel form of liquid distributing valve adapted to discharge a substantially continuous sheet of liquid throughout the cross-sectional area of said chamber and into substantially uniformly distributed wall-washing relationship to the inner walls of said chamber.

Other objects and advantages of this invention will become apparent from the following description in conjunction with the accompanying drawing, which illustrates one form of apparatus in accordance with this invention.

In the drawing, Fig. 1 is a view, partly in section of an assembly of apparatus in accordance with this invention; and Fig. 2 is a detail, partly sectional, of a valve forming a part of this invention.

Referring to the drawing and Fig. 1 in particular, 1 is a separating chamber of more or less conventional design, comprising a vertically arranged, elongated shell of enlarged cross-sectional area, constructed of steel or similar metal, and adapted to withstand comparatively high internal temperatures and pressures and having no internal mechanical liquid-vapor contacting or separating devices such as baffles, bubble trays or the like. Chamber 1 is equipped at top and bottom with axially positioned manholes 2 and 3 respectively, which are closed by respective manheads 4 and 5. A liquid discharge pipe 6 is connected into manhead 5 and is in communication with the interior of chamber 1. A vapor discharge pipe 7 is connected into the upper portion of chamber 1 and is in communication with the interior thereof.

A conduit 8 is connected into chamber 1 and extends diametrically through the wall thereof to a point substantially in the center of the chamber. The inner end of conduit 8 is fitted with a downwardly turned elbow 9, the open end of which is surrounded by a laterally extending flange 10. A circular plate 11, registering with flange 10, is suspended beneath flange 10 and spaced therefrom by means of studs 12. The distance separating flange 10 and plate 11 is variable by adjustment of studs 12 and provides a narrow, annular orifice 13 therebetween. When liquid under pressure is discharged through orifice 13, the form of the orifice will shape the discharging stream of liquid into the form of a radially extending, uniformly dispersed, sheet of liquid, the thickness of which will be determined by the size of the orifice opening. The sheet of liquid so discharged will then impinge upon the walls of chamber 1 in a substantially uniformly distributed manner, and will deposit a substantially uniform film of liquid on the walls of the chamber for a purpose to be more fully explained hereinafter.

Manhead 4 is provided with an opening 14 (Fig. 2), which is enclosed within a tubular sleeve 15, which has a laterally extending flange 16 encircling its outer end. Sleeve 15 is fixedly mounted on the outer face of manhead 4. A valve, indicated at 17, has an elongated tubular discharge nozzle 18, which extends from the exterior of the chamber axially through sleeve 15, and opening 14, into the chamber to a point above elbow 9 and in axial alignment therewith. A packing element 19 is inserted in the annular space between the outer surface of nozzle 18 and the inner wall of sleeve 15 and a packing gland 20 encircles nozzle 18 and is drawn down into compressive relationship to packing 19 by means of bolts 21, which extend through registering openings in flange 16 and the periphery of gland 20. Nozzle 18 is movable longitudinally through opening 14 to thus permit varying the position of orifice 13 vertically within chamber 1 and packing 19 provides means for sealing opening 14 against the escape of fluid from chamber 1.

Valve 17 comprises a hollow T shaped body 22 having an internally threaded side opening 23, an opposite side opening 24, threaded externally, and an internally threaded center opening 25. Body 22 is mounted on the end of nozzle 18, which extends exteriorly of chamber 1, by receiving that end within opening 23, thus placing nozzle 18 in axial alignment with openings 23 and 24. Opening 24 is closed by means of a stuffing box 26, which is mounted thereover and held in place by a nut 27 which engages the external threads of opening 24. An elongated valve stem 28 extends axially through stuffing box 26, openings 23 and 24 and nozzle 18. Stuffing box 26 is provided with packing 29 surrounding stem 28, a gland 30 and a gland nut 31 for compressing packing 29 into fluid tight engagement with stem 28. Stem 28 extends into chamber 1 a short distance beyond the end of nozzle 18 and has mounted thereon a valve plate 32, which registers with a laterally extending flange 33, which encircles the end of nozzle 18 and is rigidly attached thereto. A U-shaped guide 34 extends through registering openings in plate 32 and flange 33 to keep these parts in alignment when valve plate 32 is moved toward and away from flange 33 by reciprocation of stem 28. A variable, annularly shaped orifice 35 is thus provided between plate 32 and flange 33. The opposite end of stem 28 is pivotally connected at 36 to a laterally extending lever arm 37, which is pivotally supported at an intermediate point thereof by a bracket 38 mounted on stuffing box 26. A weight member 39 is mounted on the free end of lever arm 37 and is movable laterally thereon. A pipe 40 for introducing fluid under pressure into valve 17 is connected into opening 25. The pressure of the fluid thus introduced into valve 17 forces plate 32 away from flange 33 against the resistance of weight member 39. By adjustment of member 39 along lever arm 37 in accordance with the fluid pressure exerted against plate 32, orifice 35 may be regulated to any desired size and ordinarily, the adjustment is such as to provide a stream of fluid discharging from orifice 35, which will have the form of a susbtantially uniformly dispersed, radially extending sheet of fluid of a thickness in accordance with the size of orifice 35.

The foregoing described apparatus is utilized in the separation of highly heated hydrocarbon conversion products in a manner to be described in detail herebelow.

Hydrocarbon conversion products, heated to a high temperature in a preceding conversion operation, and under relatively high pressure, are introduced through conduit 8 into chamber 1 and discharged through orifice 13 into the chamber. The size of orifice 13 will have been adjusted previously by means of studs 12, in accordance with the pressure of the heated products, in order that the products will discharge from orifice 13 with sufficient velocity to traverse the space between orifice 13 and the inner walls of chamber 1 and to strike the inner walls thereof. Because of the form of orifice 13, the products will discharge therefrom in the form of a thin horizontal sheet, radiating substantially uniformly from the orifice and will impinge on the walls of the chamber in a substantially uniformly distributed manner. Due to the expansion of the heated products discharging from orifice 13, a portion thereof will vaporize, the relative proportion of the products which vaporize being dependent upon the temperature and pressure maintained in the chamber. When the discharged products strike the walls of the chamber, the portion thereof which remains unvaporized, and therefore in liquid form, will flow downwardly on the walls and will form a relatively uniform sheet of flowing liquid thereon, because of the uniform dispersion of the products from orifice 13. The downflowing stream of liquid products will continuously flush the walls clean of any carbonaceous matter that would otherwise tend to deposit on the walls. The liquid products and carbonaceous matter, which will then finally collect in the lower portion of chamber 1, are withdrawn therefrom as rapidly as they collect through pipe 6, in order that these products, which constitute the heaviest fractions of the conversion products and those most susceptible to over-decomposition, may be removed as quickly as possible from the zone of high temperature.

While the above method of introduction of the conversion products will maintain in clean condition that portion of the walls of the separating chamber which is below the level at which the stream of products strikes the walls, carbonaceous matter entrained in the separated vaporized products and carbonaceous matter which may result from decomposition of the vaporized products, will tend to deposit on that portion of the chamber walls not washed by the entering products. To check this condition and to control the temperature in chamber 1, relatively cool hydrocarbon wash liquid, such as gas oil or distillate, is introduced under pump pressure through pipe 40 into valve 17. Weight member 39 is positioned on lever arm 37, in accordance with the pressure and the volume of the wash liquid desired, whereby the size of orifice 35 is adjusted to cause the wash liquid to be discharged therefrom with sufficient velocity to strike the walls of chamber 1. As orifice 35 is similar in form to orifice 13, the wash liquid will also discharge in the form of a thin horizontal sheet, radiating substantially uniformly from orifice 35 and will impinge on the walls of chamber 1 in a substantially uniformly distributed manner. Since orifice 35 is above orifice 13, the wash liquid will wash a portion of the walls above that washed by the conversion products. Furthermore, since the wash liquid is comparatively cool, the discharging sheet thereof will be more or less continuous and unbroken and will form a liquid baffle in the path of the hot vapors separating from the conversion products. The hot vapors will flow upward in chamber 1 from their points of separation from liquid products and will enter pipe 7 through which they are discharged from the chamber. Orifice 35 is positioned between pipe 7 and the level of orifice 13 and the vapors flowing into pipe 7 will be forced to pass through the liquid baffle interposed in their path by orifice 13 and will be partially cooled thereby and scrubbed clean of entrained carbonaceous matter. The cool wash liquid striking the walls of the separating chamber will flush them clean of carbonaceous matter down to the portion flushed by the conversion products and will mix with the downflowing conversion products and reduce the temperature thereof, thus reducing the possibility of overdecomposition of these products and assuring the presence at all times of a liquid film on the walls of the chamber.

By utilizing the apparatus of this invention in the manner above described, it is found that temperatures of separation appreciably higher than those heretofore considered practical, can be maintained in the separating chamber, thus greatly increasing the proportion of conversion products vaporized. Also because of the double wall wash arrangement no detrimental carbonaceous deposits can collect in the chamber, and the vaporized products removed from the chamber will be relatively free of carbonaceous matter. As a result of the higher temperatures of separation possible with this apparatus, some additional desirable conversion of the vaporized products may be accomplished in the separating chamber, thus increasing the yield of light products from the process.

Generally, it is preferable that orifice 13 be located vertically well above the mid-point of chamber 1, thereby providing a relatively large free area below the point of discharge of the conversion products into the chamber, in order that effective separation of vapors from liquid products may be accomplished, for the vapors will separate from liquid as the products flow down the walls of the chamber.

The position of orifice 35 with relation to orifice 13 may be adjusted, as noted above, by moving nozzle 18 up or down through the stuffing box formed by sleeve 15 and opening 14 in manhead 4. In a conventional separating chamber, for example 40 feet long by 8 feet in diameter, the position of orifice 13 will be about 7 feet below the top of the chamber, while orifice 35 will be about 4 feet above orifice 13 or about 3 feet below the top of the chamber.

By positioning orifices 13 and 35 in the manner described, a major portion of the vaporized products will contact two separate vertically spaced liquid baffles, one from each of the orifices. Both of these baffles will act to scrub carbonaceous matter from the vapors, while the second of these baffles will also cool the vapors below a decomposition temperature.

By means of the form of liquid distributing valve 17, above described, if orifice 35 should tend to become clogged by carbonaceous matter, it is only necessary to lift the free end of arm 37, thereby depressing plate 32 and opening orifice 35 to a wide open position, permitting a large volume of wash liquid to rush therethrough and quickly flush clogging matter from the opposite surfaces of flange 33 and plate 32, without appreciably disturbing the operation of the separating apparatus.

It is important that chamber 1 be free of mechanical baffles or other devices attached to the walls of the chamber, which would tend to interrupt or slow down the flow of the liquid film on the walls of the chamber.

By means of the apparatus of this invention, separation by vaporization of conversion products may be accomplished at temperatures from 50° to 100° F. higher than those heretofore used, and the separation at these temperatures will be made without deposition of carbonaceous matter in the apparatus, and the various other advantages hitherto pointed out will also be accomplished.

It will be understood that changes may be made in the size, form and details of the apparatus of this invention without departing from the scope of the appended claims.

What I claim and desire to secure by Letters Patent is:

1. Separating apparatus of the class described comprising in combination, an elongated vertically positioned tank, the inner walls of which are free of any mechanical obstructions, means for introducing a fluid centrally in said tank, said means including a discharge nozzle provided with a peripheral discharge slot adapted to discharge said fluid radially against the inner walls of said tank in a substantially uniformly distributed manner, a first pipe communicating with the lower portion of said tank below said nozzle, a second pipe communicating with the upper portion of said tank above said nozzle, conduit means for discharging a liquid into said tank intermediate said nozzle and said second pipe, a spray valve in said conduit and positioned axially of said tank and having a variable peripheral discharge passageway adapted to discharge said liquid radially in a substantially uniformly distributed manner against the inner walls of said tank above the level contacted by said fluid, said spray valve including means operative from the exterior of said tank for varying said discharge passageway.

2. Apparatus of the class described comprising in combination, an enlarged tank, an inlet conduit extending into said tank, a discharge nozzle attached to said conduit and positioned axially of said tank, said nozzle including a horizontal ring member and a horizontal plate member spaced apart to provide a peripheral orifice therebetween, a spray valve positioned axially of said tank above said nozzle, said valve comprising a body member mounted exteriorly of said tank, an inlet to said body member, a discharge tube extending vertically from said body member into said tank to a point above said nozzle and in axial alignment therewith, a horizontally arranged orifice ring mounted on the lower end of said tube, a horizontal closure plate cooperating with said orifice ring to provide a peripheral orifice therebetween, a valve stem rigidly united with said closure plate and extending axially through said discharge tube and said body member to a point on the exterior of said tank, a lever arm pivotally connected to said valve stem, a weight member carried by said lever arm and adjustable thereon to reciprocate said stem and to vary the peripheral orifice between said orifice ring and said closure plate, a vapor outlet pipe connected to said tank at a point above both said peripheral orifices and a liquid outlet pipe connected to the lower portion of said tank.

3. Hydrocarbon separating apparatus of the class described, comprising a vertically positioned, elongated chamber of enlarged cross-sectional area, a conduit for introducing heated hydrocarbon fluid including vapor and liquid constituents into said chamber at an intermediate level thereof, nozzle means provided with annular peripheral discharge orifice cooperating with said conduit for discharging said fluid into substantially uniformly distributed wall washing contact with that portion of the chamber walls below said intermediate level, means for withdrawing liquid constituents from the lower portion of said chamber, means for withdrawing vapor constituents from the upper portion of said chamber, and means for introducing a wash liquid into said chamber above said intermediate level, said last mentioned means including a spray valve having a peripheral orifice adapted to discharge said wash liquid uniformly throughout the cross-sectional area of said chamber and into substantially uniformly distributed wall washing contact with that portion of the chamber walls above said intermediate level, said spray valve including means operative from the exterior of said tank for varying said peripheral orifice.

4. Separating apparatus of the class described comprising in combination, an elongated vertically positioned tank the inner walls of which are free of any mechanical obstructions, means for introducing a fluid centrally in said tank, said means including a discharge nozzle provided with a peripheral discharge slot adapted to discharge said fluid radially against the inner walls of said tank in a substantially uniformly distributed manner, a first pipe communicating with the lower portion of said tank below said nozzle, a second pipe communicating with the upper portion of said tank above said nozzle, conduit means for discharging a liquid into said tank intermediate said nozzle and said second pipe, a spray valve in said conduit and positioned axially of said tank and having a variable peripheral discharge passageway adapted to discharge said liquid radially in a substantially uniformly distributed manner against the inner walls of said tank above the level contacted by said fluid, said spray valve including means operative from the exterior of said tank for varying said discharge passageway and for varying the vertical position of said spray valve above the level contacted by said fluid.

5. Separating apparatus of the class described including in combination, a tank, an axial opening in one end of said tank, a conduit extending into said tank through said opening and slidable therein, a ring member encircling the discharge end of said conduit, a closure plate registering with said ring member and adjustable with respect thereto to provide a peripheral discharge passageway between the opposing end surfaces of the ring member and the plate, a stem extending axially through said conduit and having one end rigidly attached to said plate and the other end operatively connected to a lever means mounted exteriorly of said tank whereby said stem may be reciprocated to adjust the position of said plate relative to said ring member, and means for introducing a fluid centrally of said tank below said peripheral discharge passageway, said last mentioned means including a discharge nozzle provided with a peripheral discharge slot adapted to discharge said fluid radially against the inner walls of the tank.

REX YOUNG.